US012573544B2

(12) United States Patent
Koizumi et al.

(10) Patent No.: US 12,573,544 B2
(45) Date of Patent: Mar. 10, 2026

(54) MULTILAYER COIL COMPONENT

(71) Applicant: Murata Manufacturing Co., Ltd., Kyoto-fu (JP)

(72) Inventors: Kazuya Koizumi, Nagaokakyo (JP); Atsuo Hirukawa, Nagaokakyo (JP); Kaoru Tachibana, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 926 days.

(21) Appl. No.: 17/748,691

(22) Filed: May 19, 2022

(65) Prior Publication Data

US 2022/0277890 A1 Sep. 1, 2022

Related U.S. Application Data

(63) Continuation of application No. PCT/JP2020/040420, filed on Oct. 28, 2020.

(30) Foreign Application Priority Data

Nov. 22, 2019 (JP) ................................ 2019-211506

(51) Int. Cl.
*H01F 5/00* (2006.01)
*H01F 27/28* (2006.01)
(Continued)

(52) U.S. Cl.
CPC ....... *H01F 27/323* (2013.01); *H01F 27/2804* (2013.01); *H01F 27/29* (2013.01);
(Continued)

(58) Field of Classification Search
CPC .................................................... H01F 27/323
(Continued)

(56) References Cited

U.S. PATENT DOCUMENTS

2006/0152319 A1* 7/2006 Tanaka ................ H01F 17/0033 336/200
2019/0333875 A1* 10/2019 Liao ...................... H01L 23/645

FOREIGN PATENT DOCUMENTS

JP 2005-39187 A 2/2005
JP 2005-216942 A 8/2005
(Continued)

OTHER PUBLICATIONS

International Search Report issued in PCT/JP2020/040420; mailed Dec. 22, 2020.

*Primary Examiner* — Ronald Hinson
(74) *Attorney, Agent, or Firm* — Studebaker Brackett PLLC

(57) ABSTRACT

A multilayer coil component includes a multilayer body including a plurality of insulating layers and a coil therein; and first and second outer electrodes electrically connected to the coil. An axial direction of the coil is parallel to a mounting surface of the multilayer coil component. A laminating direction of the multilayer body is perpendicular to the mounting surface. When in a section of a coil conductor extending in the laminating direction, the section being taken along a plane parallel to the mounting surface, a dimension of the coil conductor in a direction parallel to an axis of the coil is a thickness of the coil, and a dimension of the coil conductor in a direction orthogonal to a direction of the thickness of the coil is a width of the coil, a value of the thickness of the coil/the width of the coil is from 1.5 to 4.0.

9 Claims, 6 Drawing Sheets

(51) Int. Cl.
*H01F 27/29* (2006.01)
*H01F 27/32* (2006.01)
*H01F 41/04* (2006.01)
*H01F 41/12* (2006.01)

(52) U.S. Cl.
CPC ......... *H01F 41/041* (2013.01); *H01F 41/122* (2013.01); *H01F 2027/2809* (2013.01)

(58) Field of Classification Search
USPC .......................................................... 336/200
See application file for complete search history.

(56) References Cited

FOREIGN PATENT DOCUMENTS

| | | | |
|---|---|---|---|
| JP | 2010-511301 | A | 4/2010 |
| JP | 2013-106030 | A | 5/2013 |
| JP | 2017-216428 | A | 12/2017 |

* cited by examiner

MULTILAYER COIL COMPONENT

CROSS-REFERENCE TO RELATED APPLICATIONS

This application claims benefit of priority to International Patent Application No. PCT/JP2020/040420, filed Oct. 28, 2020, and to Japanese Patent Application No. 2019-211506, filed Nov. 22, 2019, the entire contents of each are incorporated herein by reference.

BACKGROUND

Technical Field

The present disclosure relates to a multilayer coil component.

Background Art

As an example of a multilayer coil component, for example, in Japanese Unexamined Patent Application Publication No. 2013-106030, discloses "a multilayer ceramic electronic component including: a ceramic main body; outer electrodes formed on respective outer parts of the ceramic main body; and inner conductors forming the structure of a coil inside the ceramic main body, the central axis of the coil being parallel to the direction in which the outer electrodes are connected, the inner conductors including via conductors laminated perpendicularly to the central axis of the coil, the ratio of the area of one surface of the via conductor to the area of the other surface of the via conductor being 0.9 or more and 1.1 or less".

According to the disclosure described in Japanese Unexamined Patent Application Publication No. 2013-106030, it is possible to obtain a multilayer ceramic electronic component that is inexpensive and excellent in direct current resistance characteristics and impedance characteristics and that has high productivity.

SUMMARY

In in Japanese Unexamined Patent Application Publication No. 2013-106030, coil conductors are formed by stacking the via conductors in a laminating direction. It is assumed that the shape of an upper surface of the via conductor in in Japanese Unexamined Patent Application Publication No. 2013-106030 is a circular shape or a quadrilateral shape that is a square or a rectangle whose sides have respective lengths (X and X') substantially equal to each other.

Specifications in which large electric current can flow through such a multilayer coil component described in in Japanese Unexamined Patent Application Publication No. 2013-106030 have sometimes been required in recent years. The sectional area of a coil conductor has to be increased to increase the amount of electric current flowing through the multilayer coil component.

However, when the sectional area of the coil conductor described in Japanese Unexamined Patent Application Publication No. 2013-106030 is increased by increasing the size of the coil conductor, the inner diameter of the coil is reduced. There is a problem in that a reduction in the inner diameter of the coil reduces the efficiency in obtaining inductance.

The present disclosure is made to solve the above problem, and an object of the present disclosure is to provide a multilayer coil component through which large electric current can flow and that has high efficiency in obtaining inductance.

A multilayer coil component of the present disclosure includes: a multilayer body including a coil therein, the multilayer body being formed by laminating a plurality of insulating layers; a first outer electrode; and a second outer electrode, the first outer electrode and the second outer electrode being electrically connected to the coil. An axial direction of the coil is parallel to a mounting surface of the multilayer coil component. A laminating direction of the multilayer body is perpendicular to the mounting surface of the multilayer coil component. When in a section of a coil conductor extending in the laminating direction of the multilayer body, the section being taken along a plane parallel to the mounting surface, a dimension of the coil conductor in a direction parallel to an axis of the coil is a thickness of the coil, and a dimension of the coil conductor in a direction orthogonal to a direction of the thickness of the coil is a width of the coil, a value of the thickness of the coil/the width of the coil is 1.5 or more and 4.0 or less (i.e., from 1.5 to 4.0).

The present disclosure enables provision of a multilayer coil component through which large electric current can flow and that has high efficiency in obtaining inductance.

DETAILED DESCRIPTION

A multilayer coil component of the present disclosure will be described below.

However, the present disclosure is not limited to the following embodiments. The embodiments can be appropriately modified without departing from the gist of the present disclosure, and such modified embodiments can be used. Combinations of two or more individual preferable configurations described below are also included in the present disclosure.

Embodiment 1

Figure 1:
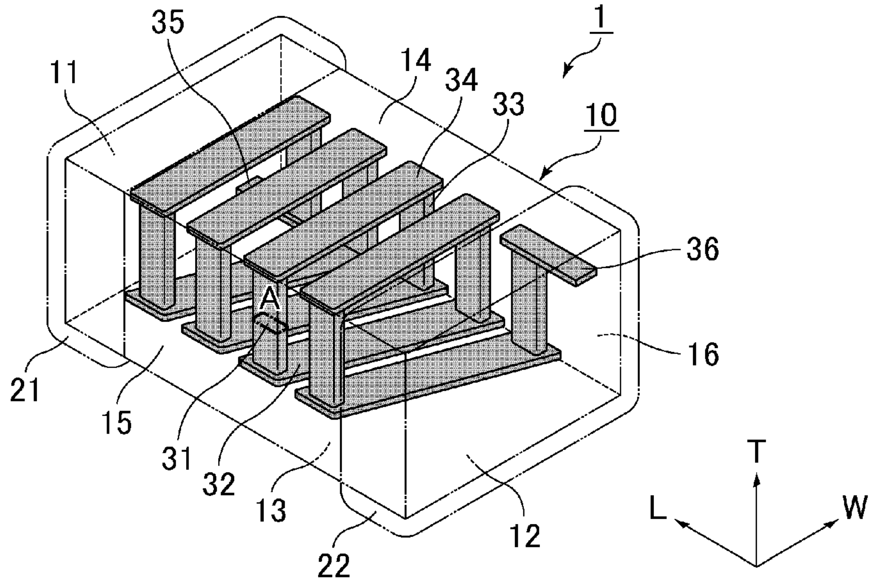
FIG. 1 is a perspective view schematically illustrating an example of a multilayer coil component of the present disclosure.

FIG. 1 is a perspective view schematically illustrating an example of a multilayer coil component of the present disclosure.

In FIG. 1, the multilayer coil component is schematically illustrated such that the inside of the multilayer coil component can be seen through to clarify the structure of a coil of the multilayer coil component.

A multilayer coil component 1 illustrated in FIG. 1 includes a multilayer body 10, a first outer electrode 21, and a second outer electrode 22. The multilayer body 10 has a substantially cuboid shape having six surfaces. The multilayer body 10, whose configuration will be described later, is formed by laminating a plurality of insulating layers and includes a coil therein. The first outer electrode 21 and the second outer electrode 22 are electrically connected to the coil.

The length direction, the width direction, and the height direction of each of the multilayer coil component of the present disclosure and the multilayer body are the L direction, the W direction, and the T direction in FIG. 1, respectively. Here, the length direction (L direction), the width direction (W direction), and the height direction (T direction) are orthogonal to each other.

A mounting surface of the multilayer coil component is a surface (LW plane) parallel to the length direction and the width direction. The axial direction of the coil is a direction parallel to the mounting surface. In addition, the axial direction of the coil is a direction parallel to the length direction (L direction).

The laminating direction of the multilayer body, which is the direction in which the insulating layers are laminated, is a direction perpendicular to the mounting surface of the multilayer coil component. In addition, the laminating direction is a direction parallel to the height direction (T direction).

The multilayer body 10 has a first end face 11 and a second end face 12, which face each other in the length direction, a first main surface 13 and a second main surface 14, which face each other in the height direction orthogonal to the length direction, and a first side surface 15 and a second side surface 16, which face each other in the width direction orthogonal to the length direction and the height direction.

Although not illustrated in FIG. 1, the corners and the edge lines of the multilayer body 10 are preferably rounded. Each of the corners is the part where three surfaces of the multilayer body meet each other. Each of the edge lines is the part where two surfaces of the multilayer body meet each other.

As illustrated in FIG. 1, the first outer electrode 21 is disposed so as to cover the first end face 11 of the multilayer body 10 and to cover part of the first main surface 13, part of the second main surface 14, part of the first side surface 15, and part of the second side surface 16 by extending from the first end face 11. As illustrated in FIG. 1, the second outer electrode 22 is disposed so as to cover the second end face 12 of the multilayer body 10 and to cover part of the first main surface 13, part of the second main surface 14, part of the first side surface 15, and part of the second side surface 16 by extending from the second end face 12.

When the first outer electrode 21 and the second outer electrode 22 are disposed in this manner, the first main surface 13 or the second main surface 14 is the mounting surface.

The shape of each of the first outer electrode and the second outer electrode is not particularly limited as long as the shape is formed such that the outer electrode is electrically connectable to the coil and such that the multilayer coil component is mountable at the mounting surface thereof.

For example, the first outer electrode may be formed so as to cover a region including an edge line of the first end face of the multilayer body, the edge line meeting the first main surface, and so as not to cover a region including an edge line of the first end face of the multilayer body, the edge line meeting the second main surface. In this case, the first end face is exposed in the region including the edge line where the first end face meets the second main surface. In addition, the first outer electrode does not cover the second main surface. In this case, the first main surface is the mounting surface.

Next, the coil forming the multilayer coil component will be described.

Coil conductors forming one turn of the coil are a coil conductor 33, which extends in the laminating direction at a position closer to the second side surface 16, a coil conductor 34, which extends in the width direction at a position closer to the second main surface 14, a coil conductor 31, which extends in the laminating direction at a position closer to the first side surface 15, and a coil conductor 32, which extends obliquely relative to the width direction at a position closer to the first main surface 13. The coil conductor 33, the coil conductor 34, the coil conductor 31, and the coil conductor 32 are connected to form one turn of the coil.

An extended conductor 35, which is extended to the first end face 11, and an extended conductor 36, which is extended to the second end face 12, are formed at respective ends of the coil. The extended conductor 35 is connected to the first outer electrode 21. The extended conductor 36 is connected to the second outer electrode 22.

The thickness and the width of each of the coil conductors 31 and 33 of the coil extending in the laminating direction have a specific relationship.

Figure 2:
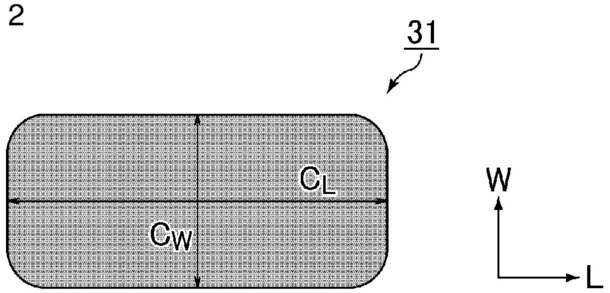
FIG. 2 is a diagram schematically illustrating a section of a coil conductor extending in a laminating direction taken along the LW plane.

FIG. 2 is a diagram schematically illustrating a section of a coil conductor extending in the laminating direction taken along the LW plane.

The LW plane is a plane parallel to the mounting surface.

The section in FIG. 2 is the section of the coil conductor 31 surrounded by dotted line A in FIG. 1.

FIG. 2 illustrates the coil conductor 31 and the length direction (L direction), which is a direction parallel to the axis of the coil. The dimension of the coil conductor 31 in the direction parallel to the axis of the coil is the thickness of the coil. The thickness of the coil is the dimension represented by double-pointed arrow $C_L$ in FIG. 2.

A direction orthogonal to the direction of the thickness of the coil is the width direction (W direction) of the multilayer body.

FIG. 2 illustrates the coil conductor 31 and the direction (W direction) orthogonal to the direction of the thickness of the coil. The dimension of the coil conductor 31 in the direction orthogonal to the direction of the thickness of the coil is the width of the coil. The width of the coil is the dimension represented by double-pointed arrow $C_W$ in FIG. 2.

The relationship between the thickness and the width of the coil of the multilayer coil component of the present disclosure is as follows. The value of the thickness of the coil/the width of the coil is 1.5 or more and 4.0 or less (i.e., from 1.5 to 4.0).

There is a case in which the sectional area of the coil conductor is increased to increase the amount of electric current flowing through the multilayer coil component. When the width of the coil is increased in this case, there arises a problem in that the inner diameter of the coil is reduced. However, the sectional area of the coil conductor can be increased by increasing the thickness of the coil without increasing the width of the coil. In this case, the width of the coil is not increased. Thus, the inner diameter of the coil is not reduced. As a result, the efficiency in obtaining inductance is not reduced.

That is, when the value of the thickness of the coil/the width of the coil is increased, and more specifically, the value of the thickness of the coil/the width of the coil is 1.5 or more, it is possible to provide a multilayer coil component through which large electric current can flow and that has high efficiency in obtaining inductance.

On the other hand, a state in which the value of the thickness of the coil/the width of the coil is increased means a state in which the width of the coil is reduced or a state in which the thickness of the coil is increased. Excessive reduction in the width of the coil may cause breaking of the coil conductor. In addition, excessive increase in the thickness of the coil reduces the efficiency in obtaining inductance because the number of turns of the coil is reduced. From these viewpoints, the value of the thickness of the coil/the width of the coil is 4.0 or less.

The sectional area of the coil conductor extending in the laminating direction is preferably 0.0096 $mm^2$ or more.

When the sectional area of the coil conductor extending in the laminating direction is 0.0096 $mm^2$ or more, it is possible to form a multilayer coil component suitable for specifications in which large electric current flows. In addition, the sectional area of the coil conductor extending in the laminating direction is preferably 0.1296 $mm^2$ or less.

The thickness of the coil conductor of the coil extending in the laminating direction is preferably 0.12 mm or more and 0.72 mm or less (i.e., from 0.12 mm to 0.72 mm). In addition, the width of the coil conductor of the coil extending in the laminating direction is preferably 0.08 mm or more and 0.18 mm or less (i.e., from 0.08 mm to 0.18 mm).

It is preferable to satisfy the requirement of the value of the thickness of the coil/the width of the coil within such ranges.

The number of winds (turns) of the coil of the multilayer coil component of the present disclosure is preferably 2 or more and 10 or less (i.e., from 2 to 10).

The length of the multilayer coil component is preferably 1.57 mm or more and 1.63 mm or less (i.e., from 1.57 mm to 1.63 mm).

The width of the multilayer coil component is preferably 0.77 mm or more and 0.83 mm or less (i.e., from 0.77 mm to 0.83 mm).

The height of the multilayer coil component is preferably 0.77 mm or more and 0.83 mm or less (i.e., from 0.77 mm to 0.83 mm).

Next, an example of a method for producing the multilayer coil component in the present embodiment will be described.

A method for producing a multilayer body by a printing lamination method will be described below.

The printing lamination method is a method in which coil conductors extending in the laminating direction of a multilayer body are formed by applying and laminating a conductive paste and a ceramic paste.

This method is different from a method in which a plurality of sheets including via conductors therein are produced by performing laser drilling on the sheets and by filling drilled holes with a conductive paste and the produced sheets are laminated.

Figure 3:
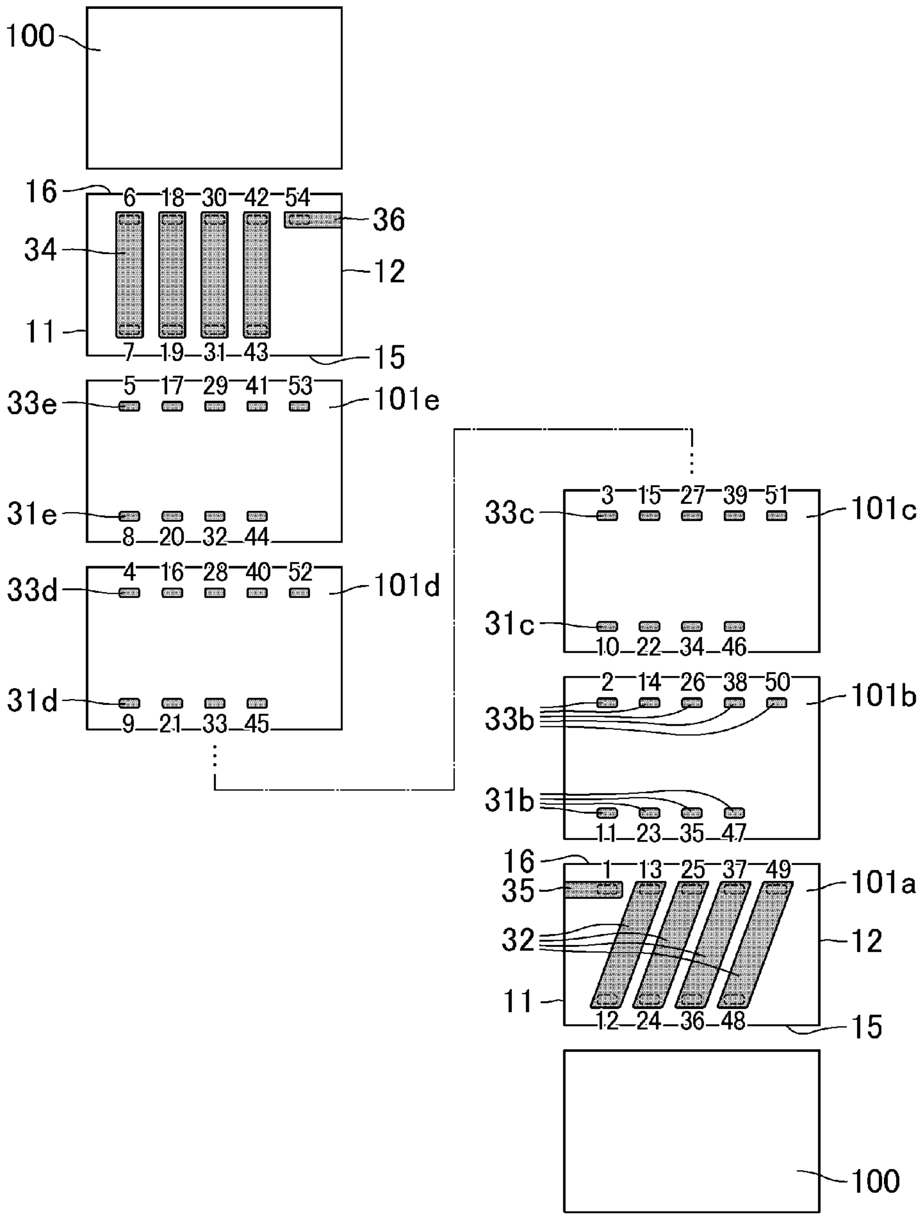
FIG. 3 is an exploded view schematically illustrating a method for producing a multilayer body by a printing lamination method.

FIG. 3 is an exploded view schematically illustrating a method for producing a multilayer body by a printing lamination method.

FIG. 3 illustrates the configuration of layers forming the multilayer body produced by the printing lamination method.

In the printing lamination method, a conductive paste and a ceramic paste are applied in turn to an outer layer 100, which serves as a base and is an insulating layer illustrated at the lowest part in FIG. 3, so as to form illustrated patterns arranged in an upward direction in the figure.

Ceramic paste is a material that is made into an insulating layer by firing.

FIG. 3 illustrates the state of an upper surface of each layer to which pastes have been applied. The layers illustrated in FIG. 3 are not separately produced to laminate the layers.

First, a ceramic paste and a conductive paste as materials are prepared.

A ferrite paste is preferably used as such a ceramic paste.

A ferrite material containing 40 mol % or more and 49.5 mol % or less (i.e., from 40 mol % to 49.5 mol %) of Fe in terms of $Fe_2O_3$, 5 mol % or more and 35 mol % or less (i.e., from 5 mol % to 35 mol %) of Zn in terms of ZnO, 4 mol % or more and 12 mol % or less (i.e., from 4 mol % to 12 mol %) of Cu in terms of CuO, and 8 mol % or more and 42 mol % or less (i.e., from 8 mol % to 42 mol %) of Ni in terms of NiO is preferably used for such a ferrite paste. Trace additives (including incidental impurities) such as Bi, Sn, Mn, and Co may be contained in the above material.

Examples of a method for producing such a ceramic paste include the following method.

$Fe_2O_3$, ZnO, CuO, NiO, and optional additives are weighed to form a predetermined composition. The weighed materials are put into a ball mill and mixed and ground by a wet method. Then, the ground materials are discharged, evaporated, and dried. Then, the dried materials are calcined at a temperature of 700° C. or higher and 800° C. or lower (i.e., from 700° C. or to 800° C.) to obtain calcined powder.

Predetermined amounts of a solvent (such as a ketone solvent), a resin (such as polyvinyl acetal), and a plasticizer (such as an alkyd plasticizer) are mixed with this calcined powder. The mixture is kneaded with a planetary mixer and then dispersed with a triple roll mill to produce a ferrite paste.

A paste containing silver as a conductive material is preferably used as such a conductive paste.

Examples of a method for producing such a conductive paste include the following method.

Predetermined amounts of a solvent (such as eugenol), a resin (such as ethyl cellulose), and a dispersant are mixed with prepared silver powder. The mixture is kneaded with a planetary mixer and then dispersed with a triple roll mill to produce a conductive paste.

The procedure for printing lamination is performed from the bottom to the top of the figure. Thus, the following description is given in this order.

First, a thermal release sheet and a base film are stacked on a metal plate, and a ceramic paste is applied thereto predetermined times to prepare an outer layer.

A polyethylene terephthalate (PET) film can be preferably used as such a base film.

The outer layer 100 is illustrated at the lowest part in FIG. 3.

Next, the extended conductor 35 closer to the first end face 11 and the coil conductors 32 extending obliquely relative to the width direction are formed by applying the conductive paste to the outer layer 100 so as to form the second pattern from the bottom of FIG. 3.

The numbers affixed beside respective conductors represent the order in which the conductors are connected to form the coil, and the order will be described later.

Subsequently, a ceramic paste 101*a* is applied to the region in which the extended conductor 35 and the coil conductors 32 are not formed. The thickness of the ceramic paste 101*a* is set to be substantially equal to the thickness of each of the extended conductor 35 and the coil conductors 32.

The second pattern from the bottom of FIG. 3 represents an upper surface to which the ceramic paste 101*a* has been applied.

Next, conductors 31*b*, which form respective parts of the coil conductors 31, and conductors 33*b*, which form respective parts of the coil conductors 33, are formed by applying the conductive paste so as to form the third pattern from the bottom of FIG. 3.

Subsequently, a ceramic paste 101*b* is applied to the region in which the conductors 31*b* and the conductors 33*b* are not formed. The thickness of the ceramic paste 101*b* is set to be substantially equal to the thickness of each of the conductors 31*b* and the conductors 33*b*.

The third pattern from the bottom of FIG. 3 represents an upper surface to which the ceramic paste 101*b* has been applied.

Next, conductors 31*c*, which form respective parts of the coil conductors 31, and conductors 33*c*, which form respective parts of the coil conductors 33, are formed by applying the conductive paste so as to form the fourth pattern from the bottom of FIG. 3.

Subsequently, a ceramic paste 101*c* is applied to the region in which the conductors 31*c* and the conductors 33*c* are not formed. The thickness of the ceramic paste 101*c* is set to be substantially equal to the thickness of each of the conductors 31*c* and the conductors 33*c*.

The fourth pattern from the bottom of FIG. 3 represents an upper surface to which the ceramic paste 101*c* has been applied.

Thereafter, in a similar manner, the coil conductors extending in the laminating direction are formed by repeating application of the conductive paste and the ceramic paste so as to form the required number of layers.

The fourth pattern from the top of FIG. 3 is a pattern in which conductors 31*d*, conductors 33*d*, and a ceramic paste 101*d* are applied. In addition, the third pattern from the top of FIG. 3 is a pattern in which conductors 31*e*, conductors 33*e*, and a ceramic paste 101*e* are applied.

Then, the extended conductor 36 closer to the second end face 12 and the coil conductors 34 extending in the width direction are formed by applying the conductive paste so as to form the second pattern from the top of FIG. 3.

Finally, an outer layer 100 is formed by applying a ceramic paste predetermined times so as to entirely cover the extended conductor 36 and the coil conductors 34.

Next, the layers are pressure bonded while being attached to the metal plate and are cooled. Then, the metal plate and the base film are detached from the layers in this order to obtain an assemblage (multilayer body block) including a plurality of elements that have the patterns illustrated above and that are arranged in one plane.

The multilayer body block is cut into elements by, for example, a dicer.

Each of the elements corresponds to one multilayer coil component.

The corners of the obtained elements are planed so as to be rounded by barrel processing. The barrel processing may be performed on elements that are yet to be subjected to firing or on multilayer bodies that have been subjected to firing. In addition, the barrel processing may be performed by using a dry method or a wet method. A method in which elements are rubbed against each other in the barrel processing or a method in which the barrel processing is performed with media may be used.

After the barrel processing, a multilayer body is obtained by subjecting the element to firing at a temperature of 910° C. or higher and 930° C. or lower (i.e., from 910° C. to 930° C.).

After the firing, a paste containing metal is applied to the first end face and the second end face of the multilayer body and baked to form base electrodes.

Subsequently, a first outer electrode and a second outer electrode are formed by forming a Ni coating and a Sn coating in turn on each base electrode by performing electrolytic plating. As a result, it is possible to obtain a multilayer coil component.

In a coil obtained in this manner, conductors are connected in an order as described below. FIG. 3 illustrates the order in which the conductors forming the coil are connected to form the coil with the numbers affixed beside the respective conductors.

First, the extended conductor 35 closer to the first end face 11 is connected to the conductor 33*b* located on the extended conductor 35 (numbers 1 and 2). The conductor 33*b* is connected to the conductor 33*c* located on the conductor 33*b*, the conductor 33*d* located on the conductor 33*c*, and the conductor 33*e* located on the conductor 33*d* (numbers 2 to 5). The conductor 33*e* is connected to the coil conductor 34 located on the conductor 33*e* (numbers 5 and 6).

The coil conductor 33 extending in the laminating direction at a position closer to the second side surface 16 is formed through the above connection process.

The coil conductor 34 extends in the width direction from a position closer to the second side surface 16 toward the first side surface 15 (numbers 6 and 7).

The coil conductor 34 is connected to the conductor 31*e* located under the coil conductor 34 (numbers 7 and 8). The conductor 31*e* is connected to the conductor 31*d* located under the conductor 31*e*, the conductor 31*c* located under the conductor 31*d*, and the conductor 31*b* located under the conductor 31*c* (numbers 8 to 11). The conductor 31*b* is connected to the coil conductor 32 located under the conductor 31*b* (numbers 11 and 12).

The coil conductor 31 extending in the laminating direction at a position closer to the first side surface 15 is formed through the above connection process.

The coil conductor 32 extends obliquely relative to the width direction from a position closer to the first side surface 15 toward the second side surface 16 (numbers 12 and 13).

Through these processes, the coil conductor 33, the coil conductor 34, the coil conductor 31, and the coil conductor 32 are connected to form one turn of the coil.

Subsequently, the coil conductor 32 is connected to the conductor 33*b* located on the coil conductor 32 (numbers 13 and 14). The conductor 33*b* is connected to the conductor 33*c* located on the conductor 33*b*, the conductor 33*d* located on the conductor 33*c*, and the conductor 33*e* located on the conductor 33*d* (numbers 14 to 17). The conductor 33*e* is connected to the coil conductor 34 located on the conductor 33*e* (numbers 17 and 18).

The description of the connection order after the above is omitted. A coil whose axial direction is parallel to the mounting surface is formed by connecting conductors in such a connection order. At an end of the coil, a conductor 33*e* is connected to the extended conductor 36 closer to the second end face 12 (numbers 53 and 54).

The relationship between the thickness and the width of the coil conductor extending in the laminating direction of the coil of the multilayer coil component of the present disclosure is as follows. The value of the thickness of the coil/the width of the coil is 1.5 or more and 4.0 or less (i.e., from 1.5 to 4.0). The thickness and the width of the coil are determined by the size of a conductor forming the coil conductor extending in the laminating direction.

Thus, coil conductors of a coil having an appropriate thickness and width can be formed by adjusting the pattern in which conductors (such as the conductors 31*b*) forming respective parts of the coil conductors 31 and conductors (such as the conductors 33*b*) forming respective parts of the coil conductors 33 are applied.

A method in which a plurality of sheets including via conductors therein are produced by performing laser drilling on the sheets and by filling drilled holes with a conductive paste and the produced sheets are laminated is conceivable as another method for producing coil conductors extending in a laminating direction. The via conductors formed by using this method are conductors tapered in the laminating direction due to laser drilling. Thus, the coil conductors extending in the laminating direction each have a shape in which a plurality of tapered via conductors are stacked.

In addition, when coil conductors extending in a laminating direction are produced by this method, it is difficult to provide a via conductor having a shape in which the value of the thickness of a coil/the width of the coil is 1.5 or more because circular holes are generally formed by such laser drilling. Thus, when the sectional area of the coil conductor is increased, the inner diameter of the coil is reduced.

On the other hand, when coil conductors extending in a laminating direction are produced by a printing lamination method, the coil conductors each can have a shape that is not tapered in the laminating direction.

In addition, it is possible to form the coil conductor such that the value of the thickness of a coil/the width of the coil is 1.5 or more as described above.

Embodiment 2

Subsequently, a multilayer coil component in another embodiment of the present disclosure will be described.

The multilayer coil component in the present embodiment includes a coil including thick turn portions in which the value of the thickness of the coil/the width of the coil in wiring lines forming one turn of the coil is relatively large, and thin turn portions in which the value of the thickness of the coil/the width of the coil in wiring lines forming one turn of the coil is relatively small.

The above feature will be described below.

Figure 4:
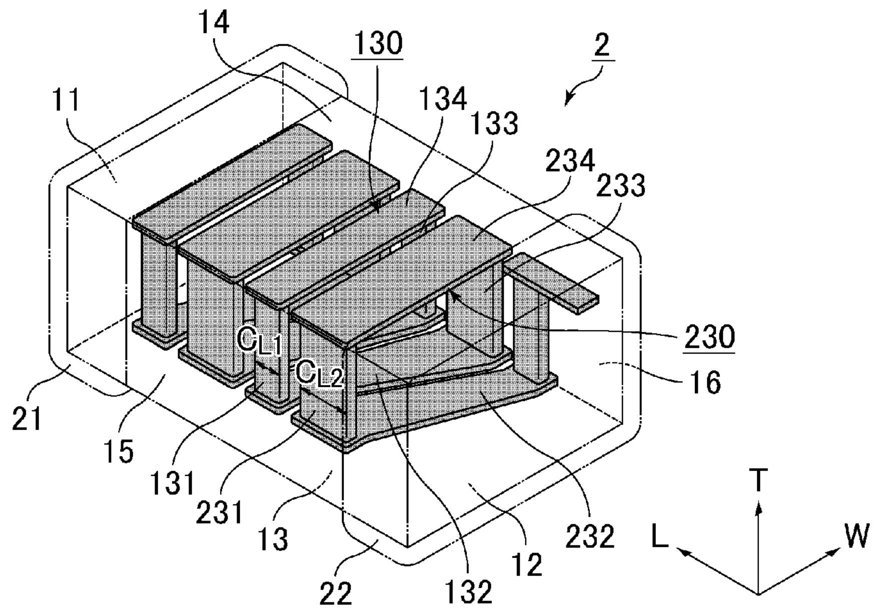
FIG. 4 is a perspective view schematically illustrating another example of the multilayer coil component of the present disclosure.

FIG. 4 is a perspective view schematically illustrating another example of the multilayer coil component of the present disclosure.

A multilayer coil component 2 illustrated in FIG. 4 includes coil conductors for forming a thick turn portion 230, in which the value of the thickness of the coil/the width of the coil is relatively large, and coil conductors for forming a thin turn portion 130, in which the value of the thickness of the coil/the width of the coil is relatively small.

The coil conductors for forming the thin turn portion 130 are a coil conductor 133, which extends in the laminating direction at a position closer to the second side surface 16, a coil conductor 134, which extends in the width direction at a position closer to the second main surface 14, a coil conductor 131, which extends in the laminating direction at a position closer to the first side surface 15, and a coil conductor 132, which extends obliquely relative to the width direction at a position closer to the first main surface 13.

The coil conductors for forming the thick turn portion 230 are a coil conductor 233, which extends in the laminating direction at a position closer to the second side surface 16, a coil conductor 234, which extends in the width direction at a position closer to the second main surface 14, a coil conductor 231, which extends in the laminating direction at a position closer to the first side surface 15, and a coil conductor 232, which extends obliquely relative to the width direction at a position closer to the first main surface 13.

The values of the thickness of the coil/the width of the coil are compared with the focus on coil conductors extending in the laminating direction of a multilayer body. That is, a comparison of values of the thickness of the coil/the width of the coil between the coil conductor 131 and the coil conductor 231 or between the coil conductor 133 and the coil conductor 233 is performed. FIG. 4 illustrates a thickness $C_{L1}$ of the coil conductor 131 of the coil and a thickness $C_{L2}$ of the coil conductor 231 of the coil with respective double-pointed arrows. The thickness $C_{L2}$ of the coil conductor 231 of the coil is larger than the thickness $C_{L1}$ of the coil conductor 131 of the coil. The width of the coil conductor 131 of the coil and the width of the coil conductor 231 of the coil are equal to each other.

Thus, in the coil conductor 231 of the coil, whose thickness $C_{L2}$ is large, the value of the thickness of the coil/the width of the coil is relatively large, and the coil conductor 231 forms the thick turn portion 230, whose conductors are thick. In the coil conductor 131 of the coil, whose thickness $C_{L1}$ is small, the value of the thickness of the coil/the width of the coil is relatively small, and the coil conductor 131 forms the thin turn portion 130, whose conductors are thin.

In the multilayer coil component 2 in the present embodiment, the value of the thickness of the coil/the width of the coil is 1.5 or more and 4.0 or less (i.e., from 1.5 to 4.0) in any of the coil conductors (coil conductors 131 and 133) that form the thin turn portion 130 and that extend in the laminating direction of the multilayer body and of the coil conductors (coil conductors 231 and 233) that form the thick turn portion 230 and that extend in the laminating direction of the multilayer body.

Combination of the thick turn portion and the thin turn portion of the multilayer coil component in the present embodiment enables the length of the coil to be adjusted and thus enables inductance to be adjusted.

Figure 5:
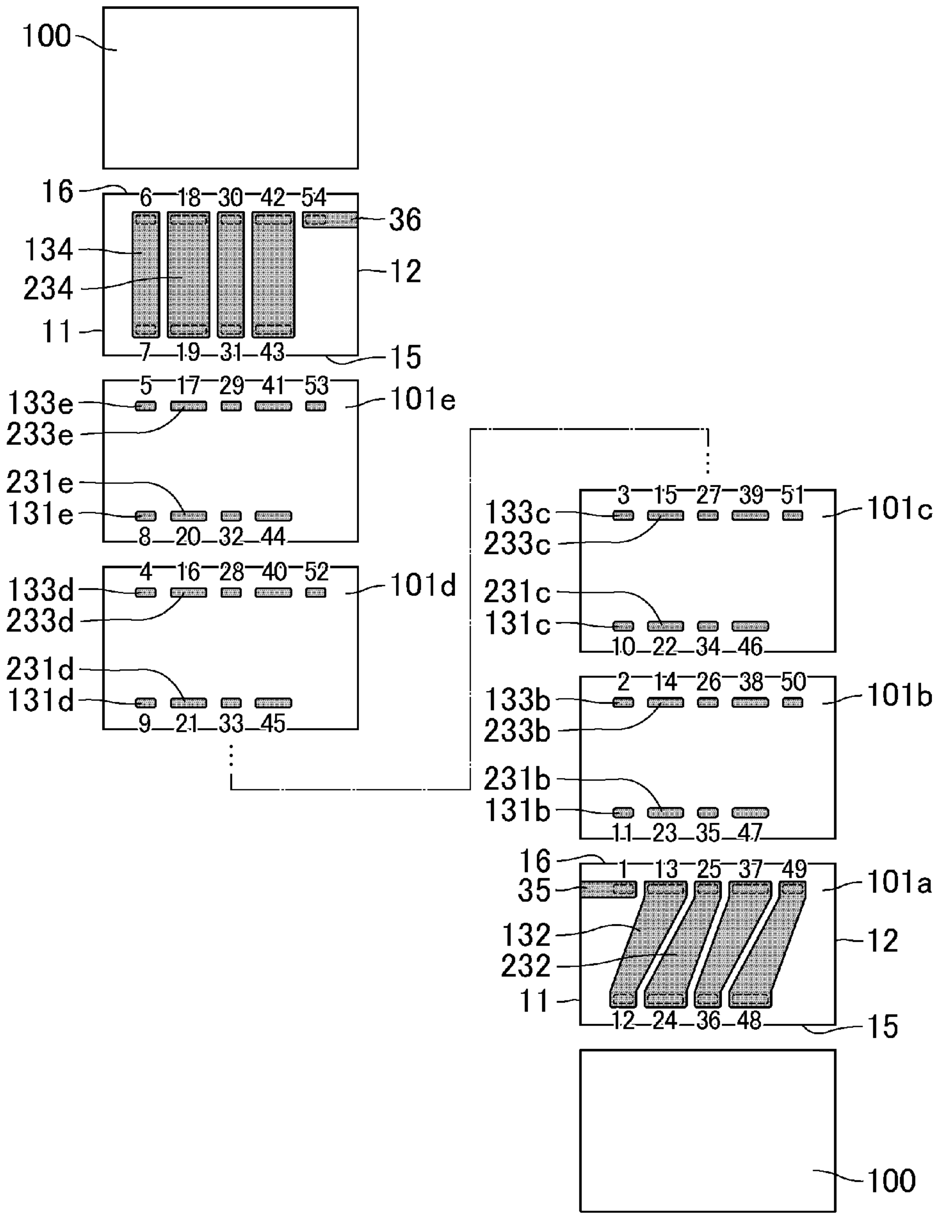
FIG. 5 is an exploded view schematically illustrating a method for producing, by a printing lamination method, a multilayer body forming a multilayer coil component in Embodiment 2.

FIG. 5 is an exploded view schematically illustrating a method for producing, by a printing lamination method, a multilayer body forming a multilayer coil component in Embodiment 2.

The order of printing for production of the multilayer coil component in Embodiment 2 is similar to the order of printing for production of the multilayer coil component in Embodiment 1 except that the shapes of the printing patterns of a conductive paste are different from each other.

In an obtained coil, conductors are connected in an order as described below. FIG. 5 illustrates the order in which the conductors forming the coil are connected to form the coil with the numbers affixed beside the respective conductors.

First, the extended conductor 35 closer to the first end face 11 is connected to a conductor 133*b* located on the extended conductor 35 (numbers 1 and 2). The conductor 133*b* is connected to a conductor 133*c* located on the conductor 133*b*, a conductor 133*d* located on the conductor 133*c*, and a conductor 133*e* located on the conductor 133*d* (numbers 2 to 5). The conductor 133*e* is connected to the coil conductor 134 located on the conductor 133*e* (numbers 5 and 6).

The coil conductor 133 extending in the laminating direction at a position closer to the second side surface 16 is formed through the above connection process.

The coil conductor 134 extends in the width direction from a position closer to the second side surface 16 toward the first side surface 15 (numbers 6 and 7).

The coil conductor 134 is connected to a conductor 131*e* located under the coil conductor 134 (numbers 7 and 8). The conductor 131*e* is connected to a conductor 131*d* located under the conductor 131*e*, a conductor 131*c* located under the conductor 131*d*, and a conductor 131*b* located under the conductor 131*c* (numbers 8 to 11). The conductor 131*b* is connected to the coil conductor 132 located under the conductor 131*b* (numbers 11 and 12).

The coil conductor 131 extending in the laminating direction at a position closer to the first side surface 15 is formed through the above connection process.

The coil conductor 132 extends obliquely relative to the width direction from a position closer to the first side surface 15 toward the second side surface 16 (numbers 12 and 13).

Through these processes, the coil conductor 133, the coil conductor 134, the coil conductor 131, and the coil conductor 132 are connected to form one turn of the coil. This one turn corresponds to the thin turn portion 130.

Subsequently, the coil conductor 132 is connected to a conductor 233*b* located on the coil conductor 132 (numbers 13 and 14). The conductor 233*b* is connected to a conductor 233*c* located on the conductor 233*b*, a conductor 233*d* located on the conductor 233*c*, and a conductor 233*e* located on the conductor 233*d* (numbers 14 to 17). The conductor 233*e* is connected to the coil conductor 234 located on the conductor 233*e* (numbers 17 and 18).

The coil conductor 234 extends in the width direction from a position closer to the second side surface 16 toward the first side surface 15 (numbers 18 and 19).

The coil conductor 234 is connected to a conductor 231*e* located under the coil conductor 234 (numbers 19 and 20). The conductor 231*e* is connected to a conductor 231*d* located under the conductor 231*e*, a conductor 231*c* located under the conductor 231*d*, and a conductor 231*b* located under the conductor 231*c* (numbers 20 to 23). The conductor 231*b* is connected to the coil conductor 232 located under the conductor 231*b* (numbers 23 and 24).

The coil conductor 231 extending in the laminating direction at a position closer to the first side surface 15 is formed through the above connection process.

The coil conductor 232 extends obliquely relative to the width direction from a position closer to the first side surface 15 toward the second side surface 16 (numbers 24 and 25).

Through these processes, the coil conductor 233, the coil conductor 234, the coil conductor 231, and the coil conductor 232 are connected to form one turn of the coil. This one turn corresponds to the thick turn portion 230.

The description of the connection order after the above is omitted. A coil whose axial direction is parallel to the mounting surface is formed by connecting conductors in such a connection order. At an end of the coil, a conductor 133*e* is connected to the extended conductor 36 closer to the second end face 12 (numbers 53 and 54).

Embodiment 3

Subsequently, a multilayer coil component in still another embodiment of the present disclosure will be described.

The multilayer coil component in the present embodiment includes a coil including outer turn portions and inner turn portions, the outer turn portions being wound outside the respective inner turn portions around the axis of the coil, the inner turn portions being wound inside the respective outer turn portions around the axis of the coil, the coil being formed by repeating formation of a basic unit including coil conductors forming the outer turn portion and the inner turn portion, the outer turn portion and the inner turn portion being continuous with each other.

The above feature will be described below.

Figure 6:
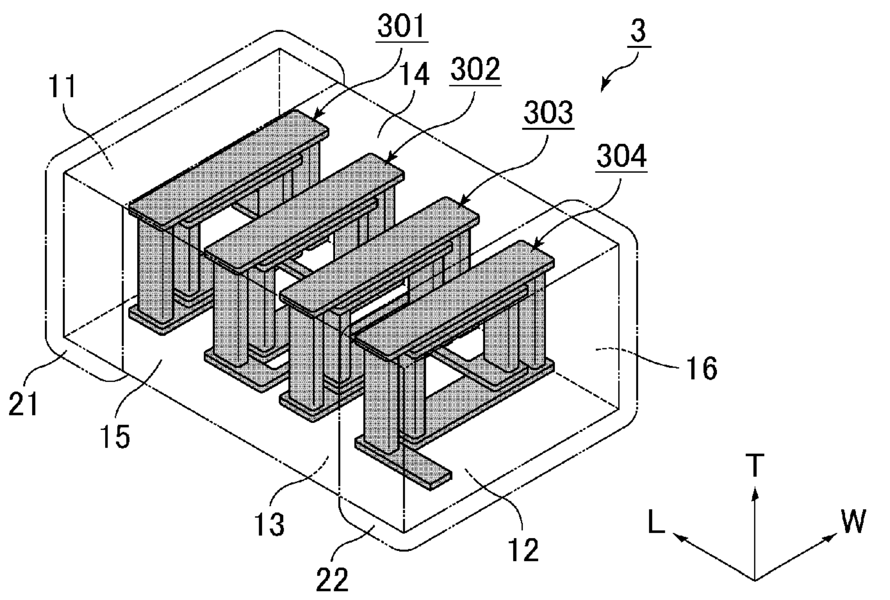
FIG. 6 is a perspective view schematically illustrating still another example of the multilayer coil component of the present disclosure.

FIG. 6 is a perspective view schematically illustrating still another example of the multilayer coil component of the present disclosure.

Figure 7:
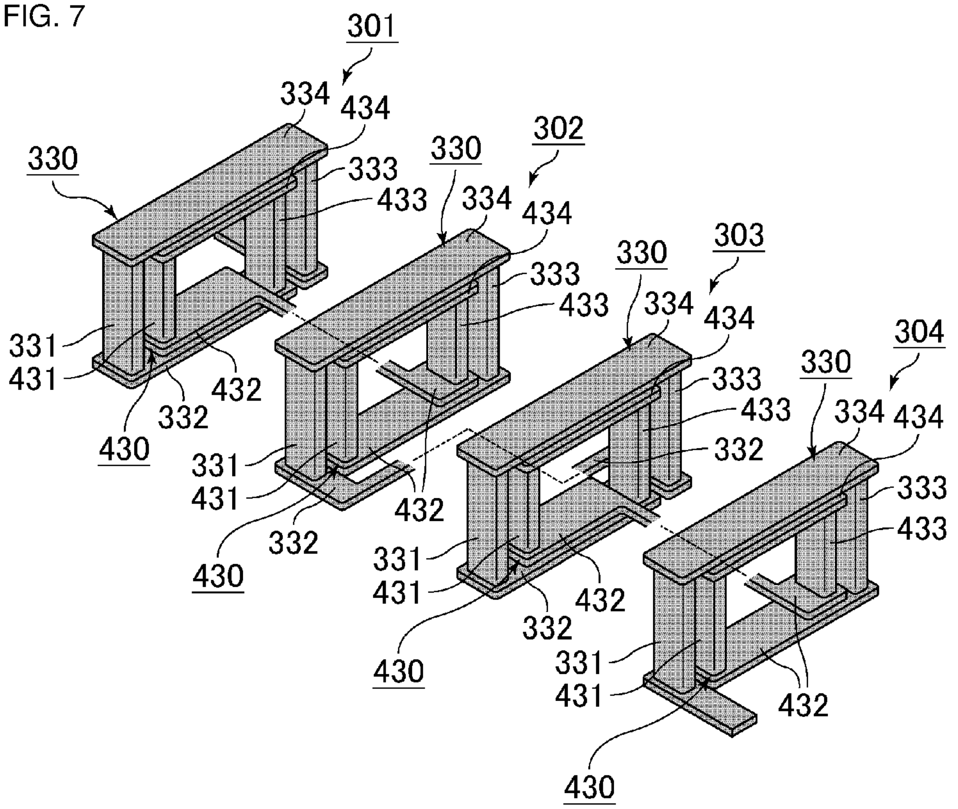
FIG. 7 is an exploded perspective view schematically illustrating a coil extracted from FIG. 6, the intervals between basic units of the coil being increased.

FIG. 7 is an exploded perspective view schematically illustrating a coil extracted from FIG. 6, the intervals between basic units of the coil being increased.

The configuration of a coil of a multilayer coil component 3 illustrated in FIG. 6 will be described below with reference to FIG. 7.

The coil illustrated in FIG. 7 includes outer turn portions 330 and inner turn portions 430. The outer turn portions 330 are wound outside the respective inner turn portions 430 around the axis of the coil. The inner turn portions 430 are wound inside the respective outer turn portions around the axis of the coil. Coil conductors forming the outer turn portion 330 and the inner turn portion 430 continuous with each other are referred to as a basic unit. The coil illustrated in FIG. 7 includes four basic units (basic units 301, 302, 303, and 304).

The configuration of the basic unit will be described with the focus on the basic unit 301.

The basic unit 301 includes the outer turn portion 330 and the inner turn portion 430.

The coil conductors forming the outer turn portion 330 are a coil conductor 333, which extends in the laminating direction at a position closer to the second side surface 16, a coil conductor 334, which extends in the width direction at a position closer to the second main surface 14, a coil conductor 331, which extends in the laminating direction at a position closer to the first side surface 15, and a coil conductor 332, which extends in the width direction at a position closer to the first main surface 13.

The coil conductor 333, the coil conductor 334, the coil conductor 331, and the coil conductor 332 are connected to form the outer turn portion 330.

The coil conductors forming the inner turn portion 430 are a coil conductor 433, which is connected to the coil conductor 332 forming the outer turn portion 330 and which extends in the laminating direction at a position closer to the second side surface 16, a coil conductor 434, which extends in the width direction at a position closer to the second main surface 14, a coil conductor 431, which extends in the laminating direction at a position closer to the first side surface 15, and a coil conductor 432, which extends in the width direction at a position closer to the first main surface 13.

The coil conductor 432 is a coil conductor connected to an adjacent basic unit.

The coil conductor 433, the coil conductor 434, the coil conductor 431, and the coil conductor 432 are respectively located inside the coil conductor 333, the coil conductor

334, the coil conductor 331, and the coil conductor 332, which form the outer turn portion 330.

The coil conductor 433, the coil conductor 434, the coil conductor 431, and the coil conductor 432 are connected to form the inner turn portion 430.

The basic unit 302 is connected to the basic unit 301. The coil conductor 432 forming the inner turn portion 430 of the basic unit 301 is connected to the coil conductor 433 forming the inner turn portion 430 of the basic unit 302. Thus, the inner turn portion 430 of the basic unit 301 is connected to the inner turn portion 430 of the basic unit 302.

The basic unit 303 is connected to the basic unit 302. The coil conductor 332 forming the outer turn portion 330 of the basic unit 302 is connected to the coil conductor 333 forming the outer turn portion 330 of the basic unit 303. Thus, the outer turn portion 330 of the basic unit 302 is connected to the outer turn portion 330 of the basic unit 303.

In this manner, in the coil illustrated in FIG. 7, the coil conductors are connected in the order of (an outer turn portion, an inner turn portion), (an inner turn portion, an outer turn portion), (an outer turn portion, an inner turn portion), and so forth.

A parenthesized combination of an outer turn portion and an inner turn portion corresponds to a basic unit.

In the present description, it is sufficient that basic units each include both an outer turn portion and an inner turn portion. The connection order may be the order from an outer turn portion to an inner turn portion or the order from an inner turn portion to an outer turn portion.

In addition, in the coil illustrated in FIG. 7, the inner turn portions of respective basic units are connected to each other. Alternatively, the outer turn portions of respective basic units are connected to each other. However, the inner turn portion and the outer turn portion of respective basic units or the outer turn portion and the inner turn portion of respective basic units can be connected by changing the patterns of the coil conductors connecting the basic units.

In the multilayer coil component 3 in the present embodiment, the value of the thickness of the coil/the width of the coil is 1.5 or more and 4.0 or less (i.e., from 1.5 to 4.0) in any of the coil conductors (coil conductors 331 and 333) that form the outer turn portion 330 and that extend in the laminating direction of the multilayer body and of the coil conductors (coil conductors 431 and 433) that form the inner turn portion 430 and that extend in the laminating direction of the multilayer body.

The number of turns of the coil of the multilayer coil component in the present embodiment can be increased by forming the coil so as to have a double winding structure including the inner turn portion and the outer turn portion.

When the value of the thickness of a coil/the width of the coil in coil conductors extending in a laminating direction of a multilayer body is increased, the number of winds of the coil is reduced by an increase in the thickness of the coil, resulting in a reduction in inductance to be obtained. However, an increase in the number of turns of the coil enables an increase in inductance to be obtained.

Figure 8:
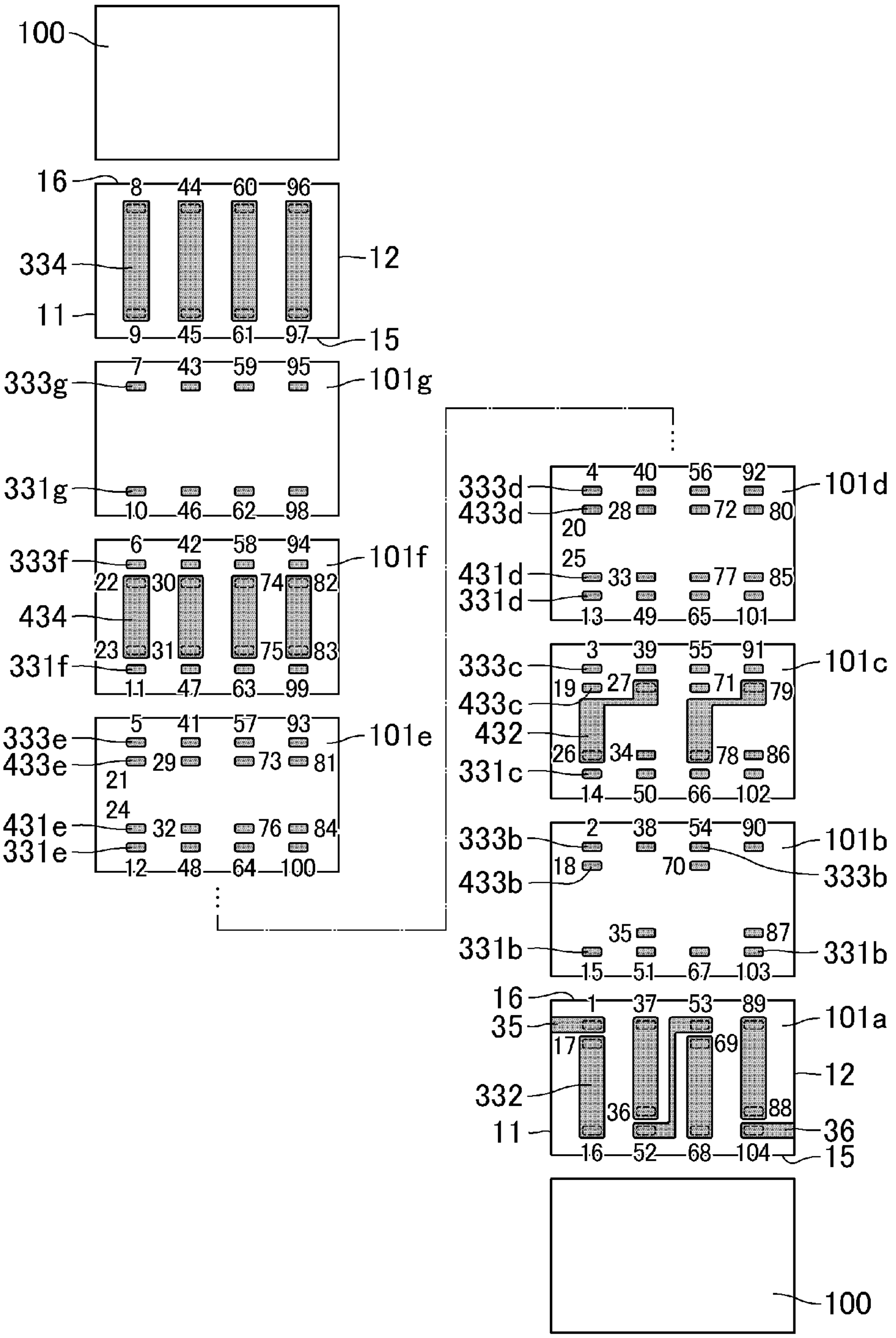
FIG. 8 is an exploded view schematically illustrating a method for producing, by a printing lamination method, a multilayer body forming a multilayer coil component in Embodiment 3.

FIG. 8 is an exploded view schematically illustrating a method for producing, by a printing lamination method, a multilayer body forming a multilayer coil component in Embodiment 3.

The order of printing for production of the multilayer coil component in Embodiment 3 is similar to the order of printing for production of the multilayer coil component in Embodiment 1 except that the shapes of the printing patterns of a conductive paste are different from each other.

In FIG. 8, ceramic pastes similar to the ceramic paste 101*a* illustrated in FIG. 3 are represented by respective reference signs 101*f* and 101*g*.

In an obtained coil, conductors are connected in an order as described below. FIG. 8 illustrates the order in which the conductors forming the coil are connected to form the coil with the numbers affixed beside the respective conductors.

First, the extended conductor 35 closer to the first end face 11 is connected to a conductor 333*b* located on the extended conductor 35 (numbers 1 and 2). The conductor 333*b* is connected to a conductor 333*c* located on the conductor 333*b*, a conductor 333*d* located on the conductor 333*c*, a conductor 333*e* located on the conductor 333*d*, a conductor 333*f* located on the conductor 333*e*, and a conductor 333*g* located on the conductor 333*f* (numbers 2 to 7). The conductor 333*g* is connected to the coil conductor 334 located on the conductor 333*g* (numbers 7 and 8).

The coil conductor 333 extending in the laminating direction at a position closer to the second side surface 16 is formed through the above connection process.

The coil conductor 334 extends in the width direction from a position closer to the second side surface 16 toward the first side surface 15 (numbers 8 and 9).

The coil conductor 334 is connected to a conductor 331*g* located under the coil conductor 334 (numbers 9 and 10). The conductor 331*g* is connected to a conductor 331*f* located under the conductor 331*g*, a conductor 331*e* located under the conductor 331*f*, a conductor 331*d* located under the conductor 331*e*, a conductor 331*c* located under the conductor 331*d*, and a conductor 331*b* located under the conductor 331*c* (numbers 10 to 15). The conductor 331*b* is connected to the coil conductor 332 located under the conductor 331*b* (numbers 15 and 16).

The coil conductor 331 extending in the laminating direction at a position closer to the first side surface 15 is formed through the above connection process.

The coil conductor 332 extends in the width direction from a position closer to the first side surface 15 toward the second side surface 16 (numbers 16 and 17).

Through these processes, the coil conductor 333, the coil conductor 334, the coil conductor 331, and the coil conductor 332 are connected to form one turn of the coil. This one turn corresponds to the outer turn portion 330.

Subsequently, the coil conductor 332 is connected to a conductor 433*b* located on the coil conductor 332 (numbers 17 and 18). The conductor 433*b* is connected to a conductor 433*c* located on the conductor 433*b*, a conductor 433*d* located on the conductor 433*c*, and a conductor 433*e* located on the conductor 433*d* (numbers 18 to 21). The conductor 433*e* is connected to the coil conductor 434 located on the conductor 433*e* (numbers 21 and 22).

The coil conductor 434 extends in the width direction from a position closer to the second side surface 16 toward the first side surface 15 (numbers 22 and 23).

The coil conductor 434 is connected to a conductor 431*e* located under the coil conductor 434 (numbers 23 and 24). The conductor 431*e* is connected to a conductor 431*d* located under the conductor 431*e* (numbers 24 and 25). The conductor 431*d* is connected to the coil conductor 432 located under the conductor 431*d* (numbers 25 and 26).

The coil conductor 431 extending in the laminating direction at a position closer to the first side surface 15 is formed through the above connection process.

The coil conductor 432 extends in the width direction from a position closer to the first side surface 15 toward the second side surface 16 and is connected to an adjacent basic unit (numbers 26 and 27).

Through these processes, the coil conductor 433, the coil conductor 434, the coil conductor 431, and the coil conductor 432 are connected to form one turn of the coil. This one turn corresponds to the inner turn portion 430.

The outer turn portion 330 and the inner turn portion 430 are combined to form the basic unit 301.

The coil conductor 432 forming the inner turn portion 430 of the basic unit 301 is connected to the conductor 433*d* that is part of the coil conductor 433 forming the inner turn portion 430 of the adjacent basic unit 302 (numbers 27 and 28).

Thereafter, conductors are connected in an order similar to the order in which the conductors forming the inner turn portion 430 of the basic unit 301 are connected (numbers 28 to 37). Subsequently, conductors are connected in an order similar to the order in which the conductors forming the outer turn portion 330 of the basic unit 301 are connected (numbers 37 to 52). The coil conductor 332 forming the outer turn portion 330 of the basic unit 302 extends in the width direction from a position closer to the first side surface 15 toward the second side surface 16 and is connected to an adjacent basic unit (numbers 52 and 53).

The inner turn portion 430 and the outer turn portion 330 are combined to form the basic unit 302.

The coil conductor 332 forming the outer turn portion 330 of the basic unit 302 is connected to the conductor 333*b* that is part of the coil conductor 333 forming the outer turn portion 330 of the adjacent basic unit 303 (numbers 53 and 54).

The description of the connection order after the above is omitted. A coil including outer turn portions and inner turn portions, the outer turn portions being wound outside the respective inner turn portions around the axis of the coil, the inner turn portions being wound inside the respective outer turn portions around the axis of the coil, the coil being formed by repeating formation of a basic unit including coil conductors forming the outer turn portion and the inner turn portion, the outer turn portion and the inner turn portion being continuous with each other, is formed by connecting conductors in such a connection order. At an end of the coil, a conductor 331*b* is connected to the extended conductor 36 closer to the second end face 12 (numbers 103 and 104).

What is claimed is:

1. A multilayer coil component comprising:

a multilayer body including a plurality of insulating layers and a coil therein;

a first outer electrode; and a second outer electrode, the first outer electrode and the second outer electrode being electrically connected to the coil, wherein an axial direction of the coil is parallel to a mounting surface of the multilayer coil component, a laminating direction of the multilayer body is perpendicular to the mounting surface of the multilayer coil component, and when in a section of a coil conductor extending in the laminating direction of the multilayer body, the section being taken along a plane parallel to the mounting surface, a dimension of the coil conductor in a direction parallel to an axis of the coil is a thickness of the coil, and a dimension of the coil conductor in a direction orthogonal to a direction of the thickness of the coil is a width of the coil, a value of the thickness of the coil/a value of the width of the coil is from 1.5 to 4.0.

2. The multilayer coil component according to claim 1, wherein the coil includes a thick turn portion in which the value of the thickness of the coil/the value of the width of the coil in a wiring line configuring one turn of the coil is a predetermined value, and a thin turn portion in which the value of the thickness of the coil/the value of the width of the coil in a wiring line configuring one turn of the coil is less than the predetermined value.

3. The multilayer coil component according to claim 1, wherein the coil includes an outer turn portion and an inner turn portion, the outer turn portion being wound outside the inner turn portion around the axis of the coil, the inner turn portion being wound inside the outer turn portion around the axis of the coil, and the coil is configured by repeating formation of a basic unit including coil conductors configuring the outer turn portion and the inner turn portion, the outer turn portion and the inner turn portion being continuous with each other.

4. The multilayer coil component according to claim 1, wherein the multilayer body is a printed laminated body.

5. The multilayer coil component according to claim 2, wherein the coil includes an outer turn portion and an inner turn portion, the outer turn portion being wound outside the inner turn portion around the axis of the coil, the inner turn portion being wound inside the outer turn portion around the axis of the coil, and the coil is configured by repeating formation of a basic unit including coil conductors configuring the outer turn portion and the inner turn portion, the outer turn portion and the inner turn portion being continuous with each other.

6. The multilayer coil component according to claim 2, wherein the multilayer body is a printed laminated body.

7. The multilayer coil component according to claim 3, wherein the multilayer body is a printed laminated body.

8. The multilayer coil component according to claim 5, wherein the multilayer body is a printed laminated body.

9. The multilayer coil component according to claim 1, wherein a portion of the coil conductor extends obliquely with reference to a width direction of the multilayer body.

* * * * *